(12) United States Patent
Bø et al.

(10) Patent No.: US 8,427,807 B2
(45) Date of Patent: Apr. 23, 2013

(54) CAPACITOR FOR APPLICATION IN HIGH PRESSURE ENVIRONMENTS

(75) Inventors: Ove Bø, Tanem (NO); Gunnar Snilsberg, Heimdal (NO)

(73) Assignee: Siemens Aktiengesellschaft, Munich (DE)

(*) Notice: Subject to any disclaimer, the term of this patent is extended or adjusted under 35 U.S.C. 154(b) by 82 days.

(21) Appl. No.: 12/811,853

(22) PCT Filed: Jan. 7, 2008

(86) PCT No.: PCT/EP2008/000047
§ 371 (c)(1),
(2), (4) Date: Jul. 7, 2010

(87) PCT Pub. No.: WO2009/086844
PCT Pub. Date: Jul. 16, 2009

(65) Prior Publication Data
US 2011/0164344 A1   Jul. 7, 2011

(51) Int. Cl.
*H01G 2/00* (2006.01)
*H01G 4/255* (2006.01)
*H01G 5/019* (2006.01)

(52) U.S. Cl.
USPC .......................................... 361/272; 361/311

(58) Field of Classification Search ............. None
See application file for complete search history.

(56) References Cited

U.S. PATENT DOCUMENTS

| | | | | |
|---|---|---|---|---|
| 1,652,212 A * | 12/1927 | Priess | ............................ | 361/272 |
| 3,694,709 A * | 9/1972 | Kind et al. | ....................... | 361/272 |
| 3,925,592 A | 12/1975 | Webb | ............................... | 174/17 |
| 4,453,197 A | 6/1984 | Burrage | ........................... | 361/272 |
| 6,094,337 A * | 7/2000 | Ueda et al. | ....................... | 361/311 |
| 6,265,058 B1 * | 7/2001 | Slenes et al. | ................ | 428/306.6 |
| 6,473,291 B1 * | 10/2002 | Stevenson | ................... | 361/306.3 |
| 6,917,512 B2 * | 7/2005 | Hongu et al. | .................. | 361/319 |
| 6,954,349 B2 * | 10/2005 | Shiota et al. | ................... | 361/303 |
| 7,027,286 B2 * | 4/2006 | Shiota et al. | ................... | 361/303 |
| 2004/0052028 A1 * | 3/2004 | O'Reilly et al. | ............... | 361/120 |

FOREIGN PATENT DOCUMENTS

| | | |
|---|---|---|
| DE | 4006571 A1 | 7/1990 |
| EP | 0546890 A1 | 6/1993 |
| FR | 2221898 | 10/1974 |
| GA | 1600095 | 10/1981 |
| GB | 267568 | 9/1927 |
| GB | 416751 | 9/1934 |

(Continued)

OTHER PUBLICATIONS

International Search Report and Written Opinion for Application No. PCT/EP2008/000047 (13 pages), Oct. 13, 2008.

*Primary Examiner* — Jayprakash N Gandhi
*Assistant Examiner* — Dion Ferguson
(74) *Attorney, Agent, or Firm* — King & Spalding L.L.P.

(57) ABSTRACT

A capacitor (1) for application in high pressure environments has at least two electrodes (2.1, 2.2) and at least one electrically insulating film (5) forming a dielectric between the electrodes (2.1, 2.2), each electrode (2.1, 2.2) having at least one metallic foil (3.1, 3.2) or at least one metallic layer on the electrically insulating film (5), wherein the capacitor (1) is unencapsulated and designed to allow a surrounding liquid to fill cavities of the capacitor (1). Furthermore, an electric device has at least one such capacitor (1) in a device housing, whereby the device housing is filled with an electrically insulating liquid.

20 Claims, 2 Drawing Sheets

| | FOREIGN PATENT DOCUMENTS | | | JP | 2007-109775 | * | 4/2007 |
|---|---|---|---|---|---|---|---|
| JP | 58-207614 A | 12/1983 | | WO | 93/17439 | | 9/1993 |
| JP | 58207614 | 12/1983 | | WO | 2008/145639 A1 | | 12/1998 |
| JP | 60223110 | 11/1985 | | | | | |
| JP | 2002151348 | 5/2002 | | * cited by examiner | | | |

CAPACITOR FOR APPLICATION IN HIGH PRESSURE ENVIRONMENTS

CROSS-REFERENCE TO RELATED APPLICATIONS

This application is a U.S. National Stage Application of International Application No. PCT/EP2008/000047 filed Jan. 7, 2008, which designates the United States of America. The contents of which are hereby incorporated by reference in their entirety.

TECHNICAL FIELD

The invention refers to a capacitor for application in high pressure environments comprising at least two electrodes and at least one electrically insulating film forming a dielectric between the electrodes, each electrode comprising at least one metallic foil or at least one metallic layer on the electrically insulating film.

BACKGROUND

Oil production and communication applications in subsea environments require electric devices able to withstand high pressure. However, electronic components, such as capacitors, particularly conventional electrolytic capacitors or MP capacitors are not applicable under high pressure conditions. Such capacitors exhibit electrodes stacked and rolled up in a casing partially filled with an electrolytic fluid, which would collapse under high pressure.

Electric devices containing such electronic components are often designed with a pressure proof housing in order to keep the interior of the housing at atmospheric pressure (1 atm). Due to the high pressure in deep sea environments (e.g. 300 bar at 3000 m depth) this housing needs to be adequately massive thus causing high costs.

Further drawbacks are the high effort for sealing the housing and the feedthroughs for electrical connections to the outside.

In other known approaches the housing of such electric devices is filled with an electrically insulating fluid. Although this allows a lightweight design of the device housing, the risk of damage to the capacitors persists because they are exposed to the ambient pressure transmitted by fluid in the device housing. Casting capacitors in a resin yields the risk of enclosing gas or air filled bubbles within the resin or in the capacitor itself which may cause problems when exposed to high pressure.

SUMMARY

According to various embodiments, a capacitor for application in high pressure environments and an electric device containing at least one such capacitor can be provided.

According to an embodiment, a capacitor for application in high pressure environments may comprise at least two electrodes and at least one electrically insulating film forming a dielectric between the electrodes, each electrode comprising at least one metallic foil or at least one metallic layer on the electrically insulating film, wherein the capacitor is unencapsulated and designed to allow a surrounding liquid to fill cavities of the capacitor.

According to a further embodiment, the electrically insulating film can be a plastic film. According to a further embodiment, the plastic film can be a polypropylene film. According to a further embodiment, the electrically insulating film can be a paper film. According to a further embodiment, the electrodes and the dielectric may form a block-shaped stack. According to a further embodiment, the electrodes and the dielectric can be wound up to form a coil. According to a further embodiment, the electrodes and the dielectric can be glued together. According to a further embodiment, the electrodes and the dielectric can be mechanically held together by a clamp. According to a further embodiment, a respective terminal can be welded to each electrode. According to another embodiment, an electric device may comprise at least one capacitor as described above in a device housing, whereby the device housing is filled with an electrically insulating liquid.

According to a further embodiment of the electric device, the capacitor can be fixated by its terminals. According to a further embodiment of the electric device, the capacitor can be fixated by a clamp. According to a further embodiment of the electric device, the liquid may be an oil. According to a further embodiment of the electric device, the device housing may exhibit a double wall.

According to yet another embodiment an electric device as described above is used in a deep sea environment.

BRIEF DESCRIPTION OF THE DRAWINGS

The invention will now be described in more detail with reference to the accompanying drawings, in which.

DETAILED DESCRIPTION

Figure 1:
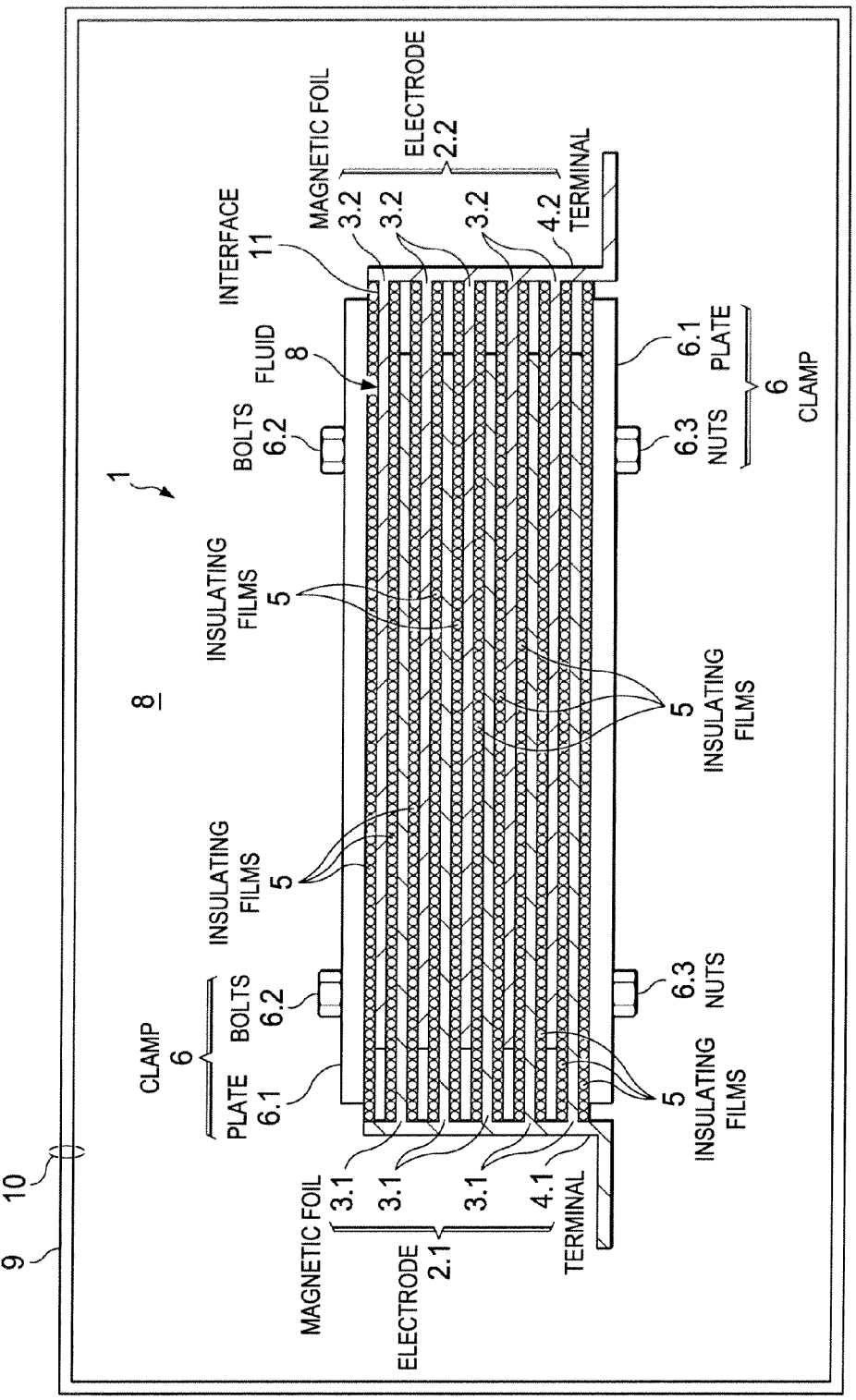
FIG. 1 is a lateral view of a capacitor for high pressure applications.

A capacitor for application in high pressure environments according to various embodiments comprises at least two electrodes and at least one electrically insulating film forming a dielectric between the electrodes. Each electrode comprises at least one metallic foil or at least one metallic layer on the electrically insulating film. The capacitor is unencapsulated, i.e. it has no casing of its own. The capacitor is designed to allow a surrounding liquid to fill cavities of the capacitor. Filling the cavities without remaining residual air or gas keeps the capacitor from collapsing under high pressure since the liquid is virtually incompressible as opposed to the air or gas.

The capacitor according to various embodiments is particularly disposed in an electric device exhibiting a device housing filled with an electrically insulating liquid. The ambient pressure outside the device housing is forwarded to the liquid.

The electric device may comprise more than one capacitor according to various embodiments and/or other electronic components. The device housing may be designed as a light weight canister because it does not have to withstand mechanical stress due to high pressure. Lightweight means thinner walls of the device housing thus reducing costs and providing better cooling to parts inside the device housing.

The liquid may serve as a coolant for semiconductors and other parts inside the electric device.

As the pressure inside and outside the device casing is essentially the same under all conditions, the risk of leakages of seawater into the device in deep sea environments is tremendously reduced.

The electrically insulating film may be a plastic film, in particular a polypropylene film.

In an alternative embodiment the electrically insulating film may be for instance a paper film.

The electrodes and the dielectric may form a block-shaped stack, wherein metallic foils or layers of one electrode are alternately stacked with those of the other electrode, respectively separated by a dielectric.

In one embodiment the electrodes and the dielectric may be wound up to form a coil keeping them together this way.

Alternatively or additionally the electrodes and the dielectric may be glued together.

In order to hold the electrodes and the dielectric together mechanically a clamp may be arranged alternatively or additionally.

A respective terminal for electrically connecting the capacitor may be welded to each electrode.

The capacitor may be fixated by the terminals or by a clamp, wherein the same clamp may serve for fixating and holding the capacitor together.

The electrically insulating liquid may be an oil.

In an embodiment the device housing exhibits a double wall. A double housing yields an improved protection of the electric device from water leakages.

In an embodiment the electric device, e.g. a power converter, is applied in a deep sea environment, e.g. in oil production or communication installations. Compared to conventional devices having a rather heavy device casing keeping the interior at atmospheric pressure in order to keep the capacitors from crushing, the electric device according to various embodiments exhibits a lightweight device casing.

The efforts for sealing the interior in order to keep sea water outside can be kept relatively low because of the non-existing difference between the ambient pressure and the interior pressure. At the same time a risk for damaging the electronic components, particularly the capacitors under high pressure inside the device is virtually zero.

Figure 2:
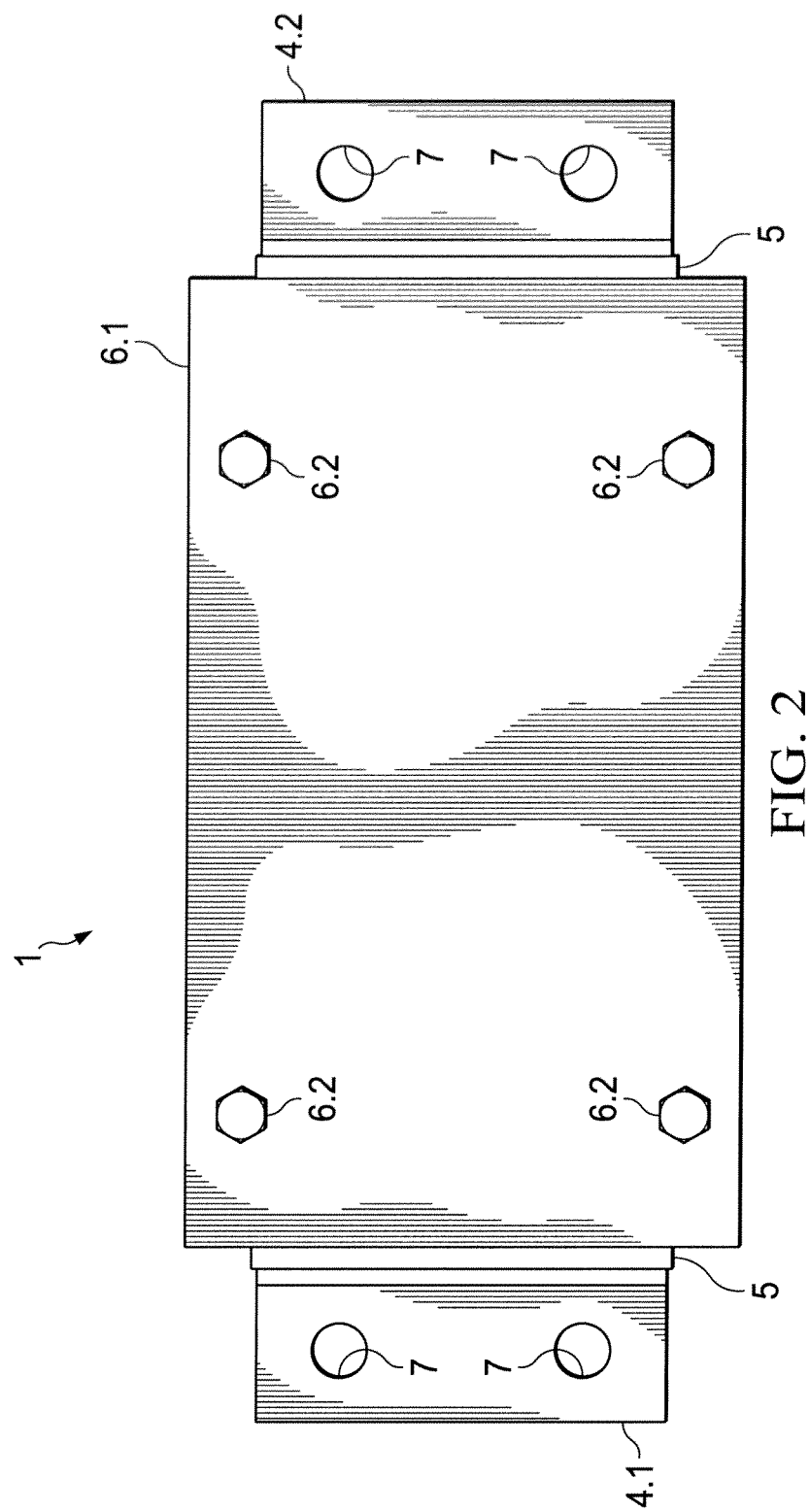
FIG. 2 is a top view of the capacitor from FIG. 1.

FIG. 1 shows a lateral view of a capacitor 1 for high pressure applications; FIG. 2 shows the capacitor 1 in a top view. The capacitor 1 comprises two electrodes 2.1, 2.2, each one consisting of metallic foils 3.1, 3.2 respectively interconnected by a terminal 4.1, 4.2. Adjacent metallic foils 3.1, 3.2 of the two electrodes 2.1, 2.2 are separated by a respective electrically insulating film 5 serving as a dielectric. The capacitor 1 is unencapsulated, i.e. it has no casing of its own.

The block-shaped stack of metallic foils 3.1, 3.2 and electrically insulating films 5 is mechanically held together by a clamp 6, consisting of plates 6.1, bolts 6.2 and nuts 6.3.

The capacitor 1 may be arranged in an electric device (not shown) exhibiting a device housing 9 filled with an electrically insulating liquid 8. The ambient pressure outside the device housing 9 is forwarded to the liquid 8. Since the capacitor 1 is unencapsulated the liquid 8 may freely enter cavities 11 between the metallic foils 3.1, 3.2 and the electrically insulating films 5, so the capacitor 1 may not crush due to high ambient pressure, e.g. when used in deep sea applications.

The electric device may comprise more than one capacitor 1 and/or other electronic components. The device housing 9 may be designed as a light weight canister. The liquid 8 may serve as a coolant for semiconductors and other parts inside the electric device.

Instead of the metallic foils 3.1, 3.2 the electrodes may comprise respective metallic layers on the electrically insulating films 5.

The electrically insulating film 5 may be a plastic film, in particular a polypropylene film. Other materials, such as polycarbonate, polystyrene, polyester or polysulfone may be applied as well.

Alternatively the electrically insulating film 5 may be a paper film.

The electrodes 2.1, 2.2 at least their metallic foils 3.1, 3.2 or layers and the electrically insulating film 5 may form a block-shaped stack as in FIGS. 1 and 2, wherein the metallic foils 3.1 or layers of one electrode 2.1 are alternately stacked with the metallic foils 3.2 or layers of the other electrode 2.2, respectively separated by one electrically insulating film 5.

Alternatively the metallic foils 3.1, 3.2 or layers and the electrically insulating film 5 may be wound up to form a coil keeping them together this way, so the clamp 6 would not be needed.

Alternatively or additionally the metallic foils 3.1, 3.2 or layers and the electrically insulating film 5 may be glued together, also making the clamp 6 redundant.

The clamp 6 may be constructed in a different way, e.g. as a wire bracket.

The terminals 4.1, 4.2 for electrically connecting the capacitor 1 may be welded to each electrode 2.1, 2.2.

The capacitor 1 may be fixated inside the device housing by the terminals 4.1, 4.2, e.g. by bore holes 7 provided therein. Alternatively or in addition the capacitor 1 may be fixated by the clamp 6.

The electrically insulating liquid 8 may be an oil.

The device housing 9 may exhibit a double wall 10.

What is claimed is:

1. A capacitor apparatus for application in high pressure environments comprising: a pair of terminals positioned on opposing lateral sides of the capacitor, at least two electrodes and at least one electrically insulating film forming a dielectric between the electrodes, each electrode comprising at least one metallic foil or at least one metallic layer on the electrically insulating film, each electrode connected to one of the terminals and extending laterally toward the other terminal, and each electrically insulating film extending laterally between the pair of terminals, wherein cavities are defined at interfaces between the insulating films and the metallic foils or layers, wherein the capacitor is disposed within a housing filled with a nonconducting liquid, wherein the capacitor is unencapsulated such that the liquid in the housing directly surrounds the capacitor and fills the cavities at the interfaces between the insulating films and the metallic foils or layers of the capacitor, wherein the housing of the capacitor apparatus is submersed in water in a deep sea environment, and wherein a pressure acting on the housing from outside the housing due to seawater is essentially the same as a pressure acting on the housing from inside the housing due to the nonconducting liquid in the housing.

2. The capacitor apparatus according to claim 1, wherein the electrically insulating film is a plastic film.

3. The capacitor apparatus according to claim 2, wherein the plastic film is a polypropylene film.

4. The capacitor apparatus according to claim 1, wherein the electrically insulating film is a paper film.

5. The capacitor apparatus according to claim 1, wherein the electrodes and the dielectric form a block-shaped stack.

6. The capacitor apparatus according to claim 1, wherein the electrodes and the dielectric are glued together.

7. The capacitor apparatus according to claim 1, wherein the electrodes and the dielectric are mechanically held together by a clamp.

8. The capacitor apparatus according to claim 1, wherein a respective terminal is welded to each electrode.

9. An electric device comprising: a housing filled with an electrically insulating liquid, at least one unencapsulated capacitor, each comprising: a pair of terminals positioned on opposing lateral sides of the capacitor, and at least two electrodes and at least one electrically insulating film forming a dielectric between the electrodes, each electrode comprising at least one metallic foil or at least one metallic layer on the electrically insulating film, each electrode connected to one of the terminals and extending laterally toward the other terminal, and each electrically insulating film extending laterally between the pair of terminals, wherein cavities are defined at interfaces between the insulating films and the metallic foils or layers, wherein the at least one unencapsulated capacitor is located within the housing and surrounded by the electrically insulating liquid such that the liquid fills the cavities at interfaces between the insulating films and the metallic foils or layers of the at least one capacitor, wherein the electric device is submersed in water in a deep sea environment, wherein a pressure acting on the housing from outside the housing due to seawater is essentially the same as a pressure acting on the housing from inside the housing due to the electrically insulating liquid in the housing.

10. The electric device according to claim 9, wherein each capacitor is fixated by one or more terminals.

11. The electric device according to claim 9, wherein each capacitor is fixated by a clamp.

12. The electric device according to claim 9, wherein the electrically insulating liquid is an oil.

13. The electric device according to claim 9, wherein the device housing exhibits a double wall.

14. A method for using an electric device in a deep sea environment, comprising:

providing an electric device having a housing filled with an electrically insulating liquid, and at least one unencapsulated capacitor including a pair of terminals positioned on opposing lateral sides of the capacitor and at least two electrodes and at least one electrically insulating film forming a dielectric between the electrodes, each electrode comprising at least one metallic foil or at least one metallic layer on the electrically insulating film, each electrode connected to one of the terminals and extending laterally toward the other terminal, and each electrically insulating film extending laterally between the pair of terminals wherein cavities are defined at interfaces between the insulating films and the metallic foils or layers, the at least one unencapsulated capacitor being arranged within the housing and surrounded by the electrically insulating liquid such that the liquid fills cavities between insulating films and metallic foils or layers of the at least one capacitor, and locating the electric device in a deep sea environment, wherein a pressure acting on the housing from outside the housing due to seawater is essentially the same as a pressure acting on the housing from inside the housing due to the electrically insulating liquid in the housing.

15. The electric device according to claim 9, wherein the electrically insulating film is a plastic film.

16. The electric device according to claim 15, wherein the plastic film is a polypropylene film.

17. The electric device according to claim 9, wherein the electrically insulating film is a paper film.

18. The electric device according to claim 9, wherein the electrodes and the dielectric form a block-shaped stack.

19. The capacitor apparatus according to claim 1, wherein the capacitor includes:

an electrode stack including: a first electrode comprising a first terminal on a first lateral side of the capacitor, and a plurality of first metallic foils extending laterally from the first terminal in a first direction, a second electrode comprising a second terminal on a second lateral side of the capacitor opposite the first lateral side, arm a plurality of second metallic foils extending laterally from the first terminal in a second direction opposite the first direction, wherein the first and second metallic foils are arranged in a stack in an alternating manner, a first plate on a first side of the electrode stack, a second plate on a second side of the electrode stack opposite the first side, and at least one fastener extending through the first plate, the electrode stack, and the second plate, the at least one fastener configured to hold the stack together.

20. The capacitor apparatus according to claim 19, wherein the first terminal includes a first generally planar flange from which the first metallic foils extend, and a second generally planar flange secured to the device housing.

\* \* \* \* \*